United States Patent [19]

Okumura

[11] Patent Number: 4,945,322
[45] Date of Patent: Jul. 31, 1990

[54] NOISE FILTER

[75] Inventor: Mitsunao Okumura, Nagaokakyo, Japan

[73] Assignee: Murata Manufacturing Co., Ltd., Japan

[21] Appl. No.: 327,591

[22] Filed: Mar. 23, 1989

[30] Foreign Application Priority Data

Mar. 23, 1988 [JP] Japan .................................. 63-70123
Jul. 19, 1988 [JP] Japan ................................. 63-180048
Oct. 3, 1988 [JP] Japan ................................. 63-249594

[51] Int. Cl.⁵ ......................... H03H 7/01; H03H 7/09
[52] U.S. Cl. .................................... 333/184; 333/181; 333/185; 361/303; 361/313
[58] Field of Search ................. 333/12, 167, 181, 184, 333/185, 177; 361/313, 303, 306, 328–330

[56] References Cited

U.S. PATENT DOCUMENTS

| | | | |
|---|---|---|---|
| 2,016,303 | 10/1935 | Sprague | 333/184 |
| 2,884,605 | 4/1959 | Dubilier | 333/184 |
| 4,048,593 | 9/1977 | Zillman | 333/185 X |
| 4,298,848 | 11/1981 | Kurose | 333/185 X |
| 4,563,658 | 1/1986 | Ikeda | 333/181 |
| 4,751,479 | 6/1988 | Parr | 333/185 X |
| 4,847,575 | 7/1989 | Ikeda | 333/185 X |

FOREIGN PATENT DOCUMENTS 0096910 5/1985 Japan ................................ 333/181
0100813 6/1985 Japan ................................ 333/181

Primary Examiner—Eugene R. LaRoche
Assistant Examiner—Seung Ham
Attorney, Agent, or Firm—Ostrolenk, Faber, Gerb & Soffen

[57] ABSTRACT

A noise filter includes a wound unit that is composed of two film sheets, one of which is laid on another. On the film sheets, conductors are respectively formed, to which terminals are fixed, respectively. By laying one of the film sheets on another film sheet and winding the same together with the conductors, the conductors on the respective film sheets oppose each other via the film sheet, whereby distributed capacitance is formed between the conductors. Cores are inserted in a hollow portion of the wound unit, whereby inductances are respectively formed by the respective conductors and the cores. The inductances connected between the terminals at an input side and the terminals at an output side, respectively. The above-described distributed capacitance is connected between the conductors that include the inductances.

9 Claims, 16 Drawing Sheets

FIG.4A
FIG.4B
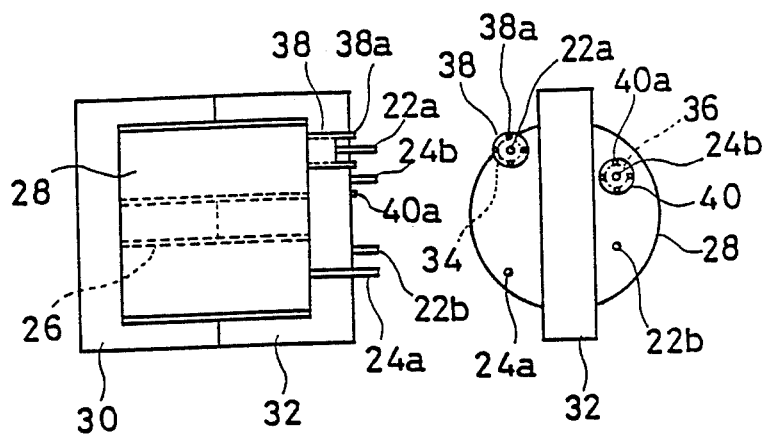
FIG.6
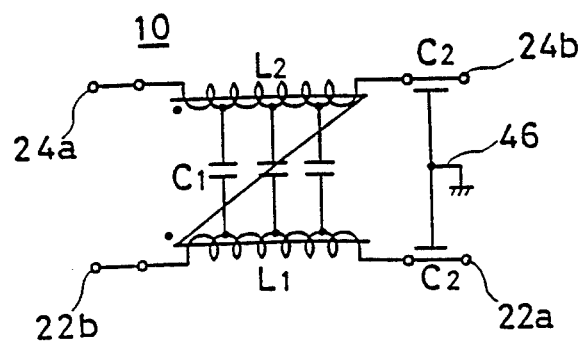

F I G. 14
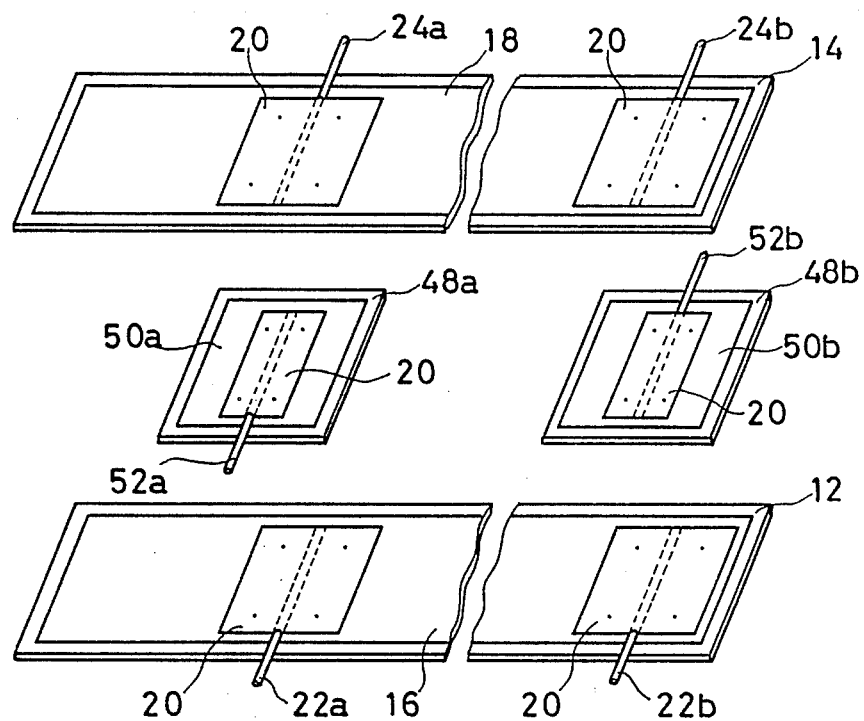
F I G. 15
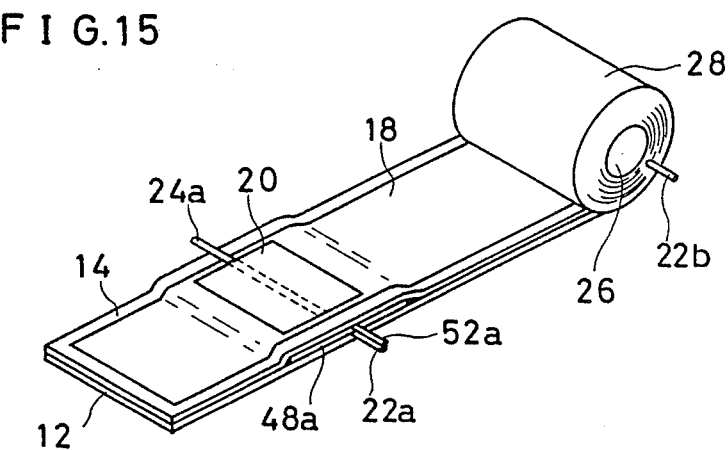

FIG.19A
FIG.19B
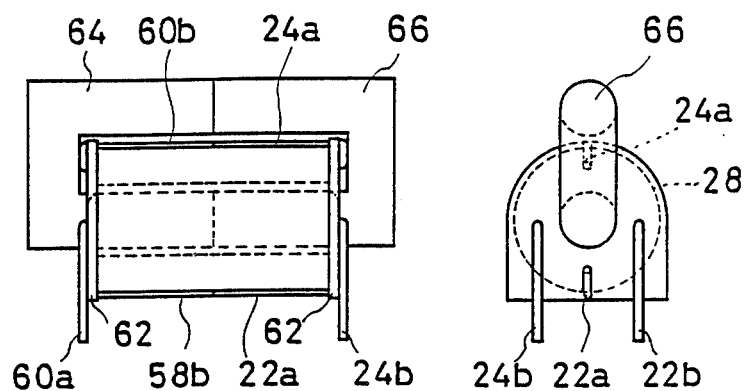
FIG.20
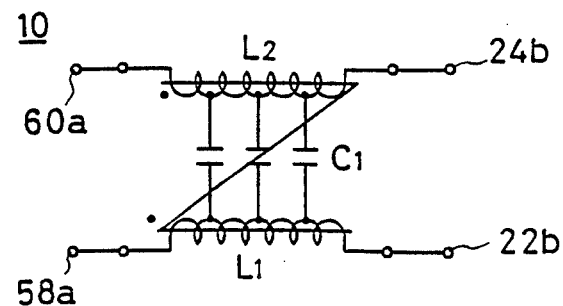

NOISE FILTER

BACKGROUND OF THE INVENTION

1. Field of the invention

The present invention relates to a noise filter. More specifically, the present invention relates to a noise filter such as a line filter wherein inductances are respectively connected between input and output terminals and capacitance is connected between a terminal at an input side and a terminal at an output side.

2. Description of Background Art

Conventionally, the foregoing kind of line filter or noise filter is manufactured by mounting a plurality of discrete components such as a capacitor, inductor and etc. as shown in an equivalent circuit diagram of FIG. 1.

Therefore, in the conventional noise filter, it takes a long time to mount-the discrete parts, and accordingly, manufacturing productivity is low, and subject to cost limitations. In addition, since the conventional noise filter is manufactured by mounting discrete components, it is impossible to miniaturize the same.

SUMMARY OF THE INVENTION

Therefore, an object of the present invention is to provide a novel noise filter.

Another object of the present invention a compact and inexpensive noise filter.

A noise filter in accordance with the present invention comprises a first longitudinal insulation sheet; a first conductor formed on one main surface of the first insulation sheet and extending in a longitudinal direction of the first insulation sheet; two first terminals fixed on the first conductor, respective ends of which are exposed in a width direction of the first insulation sheet; a second longitudinal insulation sheet laid on the first insulation sheet; a second conductor formed on one main surface of the second insulation sheet and extending in a longitudinal direction of the second insulation sheet; and two terminals fixed on the second conductor, respective ends of which are exposed in a width direction of the second insulation sheet; wherein the first and second insulation sheets are wound together with the first and second conductors so as to form a wound unit and the first and second terminals are exposed at an end surface of the wound unit.

Since the first and second insulation sheets are wound in a state where the second insulation sheet is laid on the first insulation sheet, the second insulation sheet is sandwiched by the first conductor formed on the first insulation sheet and the second conductor formed on the second insulation sheet. Therefore, distributed capacitance is formed between the first and second conductors, that is, the first and second terminals. In addition, inductances are respectively formed between the first terminals and between the second terminals by the first and second conductors themselves. Therefore, if one pair of the first and second terminals are used as input terminals and the other pair of the first and second terminals are used as output terminals, a line filter can be constructed.

In accordance with the present invention, since a noise filter is obtained only by winding the first and second insulation sheets together with the respective conductors, it is not necessary to mount a plurality of discrete parts such as a capacitor, inductor and etc. as done in the past, and, therefore, manufacturing productivity of a noise filter can be increased, resulting in less cost.

In addition, by changing positions where the first and/or second terminals are fixed on the conductors, it is possible to make a modification in which only the value of the inductance can be changed, and therefore, a high performance noise filter can be obtained.

Furthermore, in another embodiment, a plurality of the first conductors are formed on the first insulation sheet and a plurality of the second conductors are formed on the second insulation sheet. A plurality of the first terminals except for two first terminals are connected to each other such that the plurality of the first conductors can be connected in series, and therefore, inductance is formed between the two first terminals. Likewise, by connecting the plurality of second conductors in series by a plurality of second terminals except for two second terminals, inductance is formed between the two second terminals. In accordance with this embodiment, since the first and second conductors can be connected in series, respectively, larger inductance can be formed.

The foregoing and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 4(A) and FIG. 4(B) are a front view and a bottom view showing a state where E-cores are inserted in a cylindrical unit or wound unit formed as shown in FIG. 3.

FIG. 6 is an equivalent circuit diagram of FIG. 5 embodiment.

FIG. 14 and FIG. 15 are illustrative views showing another embodiment in accordance with the present invention.

FIG. 19(A) and FIG. 19(B) are a front view and a side view showing a state where U-cores are inserted in a cylindrical unit or wound unit formed as shown in FIG. 18.

FIG. 20 is an equivalent circuit diagram of a noise filter completed through steps of FIG. 17–FIG. 19.

DETAILED DESCRIPTION OF THE PREFERRED EMBODIMENTS

Figure 2:
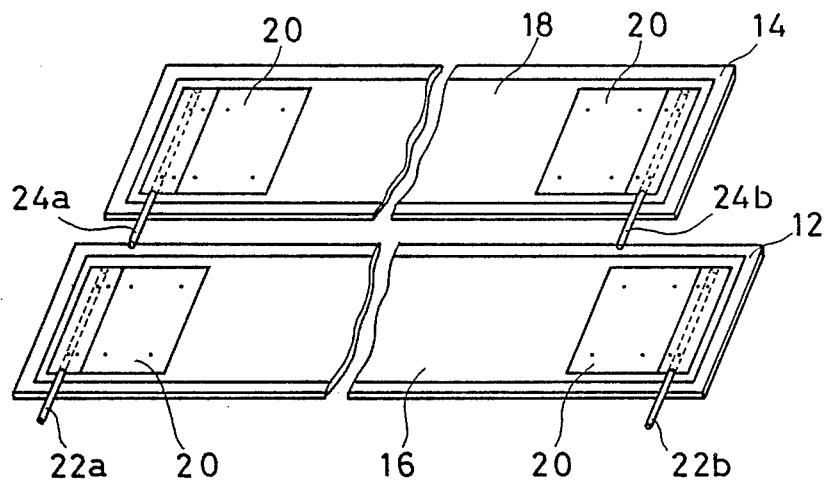
FIG. 2 is a perspective view showing unwound film sheets of one embodiment in accordance with the present invention.

With reference to FIG. 2, longitudinal film sheets 12 and 14 each of which is made of an insulation material such as polyester film are prepared. On upper surfaces of these film sheets 12 and 14, foil or leaf conductors 16 and 18 each of which is made of metal having good electrical conductivity such as aluminum or copper foil or leaf and may be referred to simply as "conductor" hereinafter are adhered in a manner that the conductors 16 and 18 are continuously extended in a longitudinal direction of the film sheets 12 and 14.

First terminals 22a and 22b and second terminals 24a and 24b are fixed on the conductors 16 and 18 at both ends thereof, respectively, by fixing further foil or leaf conductors 20 each of which is made of a metallic foil or leaf and may be referred to hereinafter as "conductor" onto the conductors 16 and 18 by means of spot welding. More specifically, each of the terminals 22a–24b is sandwiched by a portion of each the conductors 20 where an end portion of the conductor 20 of a rectangular shape is folded-back and welded by spot welding, and therefore, each of the terminals 22a–24b is integrated with each of the conductors 20. Therefore, by integrally fixing the conductors 20 onto the conductors 16 and 18 by means of spot welding, the first terminals 22a and 22b and the second terminals 24a and 24b are respectively fixed to the conductors 16 and 18 with an assured electrical connection thereto. In addition, in FIG. 2, a black spot is illustrated at each portion of the conductors 20 where the spot welding is performed. Furthermore, it is desirable to form a portion of each of the respective terminals 22a–24b at which the spot welding is to be performed in a flat shape.

Figure 3:
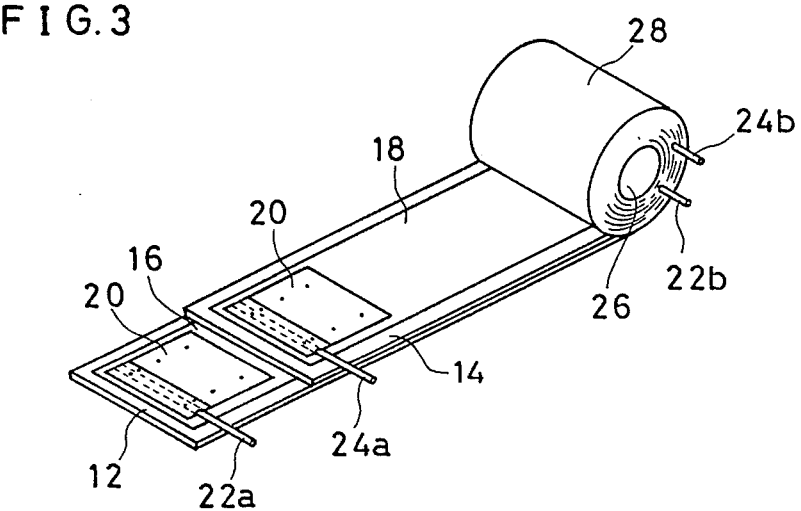
FIG. 3 is an illustrative view showing a state where film sheets shown in FIG. 2 are superposed and wound.

After completion of fixing the four terminals 22a–24b as shown in FIG. 2, the film sheet 14 is laid on the film sheet 12, and thereafter, as shown in FIG. 3, the film sheets 12 and 14 are wound together with the respective conductors 16 and 18 so as to form a wound unit or cylindrical unit in a manner that the film sheet 14 becomes an inner side.

As shown in FIG. 4, E-cores 30 and 32 are inserted into a hollow portion or hole 26 of the wound unit or cylindrical unit 28 being formed as shown in FIG. 3, from both side ends of the wound unit 28. The cores 30 and 32 are made of a material having large magnetic permeability such as ferrite and constitute a magnetic circuit in association with the conductors 16 and 18.

Next, as shown by a dotted line in FIG. 4, capacitors with throughholes 34 and 36 are capped onto ends of the first terminal 22a and the second terminal 24b among the terminals projecting or exposing at one end surface of the cylindrical unit 28 in a manner such that the throughholes of the capacitors 34 and 36 are penetrated with the first and second terminals 22a and 24b, respectively. Inner electrodes (not shown) of the capacitors with throughhole 34 and 36 are respectively connected to the first terminal 22a and the second terminal 24b and outer electrodes (not shown) thereof are respectively connected to casings 38 and 40 which cover the capacitors with throughholes 34 and 36, and terminals 38a and 40a are withdrawn from the respective casings 38 and 40. In addition, each of the terminals 38a and 40a is normally used as a ground connection terminal, and thus, it is desirable that the casings 38 and 40 are respectively provided with as many of the terminals 38a and 40a as possible.

Figure 5A:
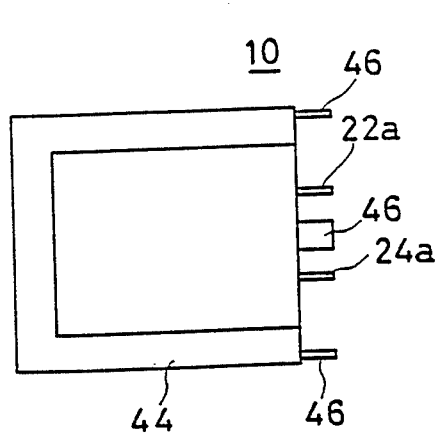
FIG. 5(A) and FIG. 5(B) are a front view and a bottom view showing a noise filter completed through steps of FIG. 2–FIG. 4.
Figure 5B:
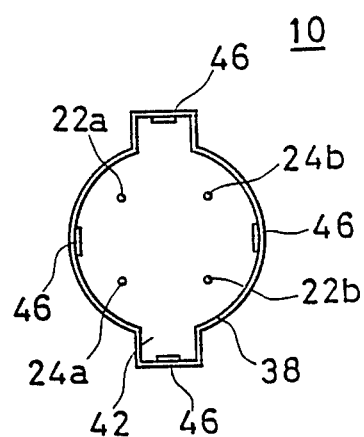
Figure 1:
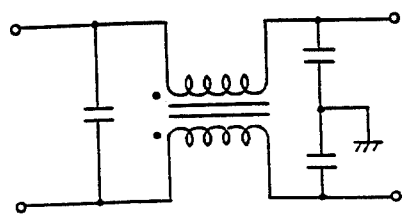
FIG. 1 is an equivalent circuit diagram showing one example of a conventional noise filter as background to the present invention.

After the cores 30 and 32 are inserted into the hollow portion or hole 26 of the cylindrical unit 28 and the capacitors with throughholes 34 and 36 are capped onto the first terminal 22a and the second terminal 24b, as shown in FIG. 5, the cylindrical unit 28 is mounted on a printed circuit board 42. At this time, the above-described terminals 22a–24b penetrate the printed circuit board 42, and the terminals 38a and 40a of the casings 38 and 40 are connected to a ground portion (not shown) of the printed circuit board 42. It is desirable that the ground portion of the printed circuit board 42 be formed so as to have as large an area as possible. Thereafter, a casing 44 is capped on the printed circuit board 42 so as to cover the cylindrical unit 28. At this time, the ground portion of the printed circuit board 42 is connected to the casing 44 at a plurality of positions. A plurality of ground connection terminals 46 are withdrawn from the casing 44.

In addition, without using the printed circuit board 42, the cylindrical unit 28 may be molded within the casing 44 as it is. Furthermore, the casing 44 is normally a metallic casing so as to function as a magnetic shield, but the same may be a plastic casing with a metal plating.

An equivalent circuit of the noise filter 10 thus obtained is shown in FIG. 6. More specifically, inductance L1 is formed between the terminals 22a and 22b by the conductor 16 on the film sheet 12 and the cores 30 and 32, and inductance L2 is formed between the terminals 24a and 24b by the conductor 18 on the film sheet 14 and the cores 30 and 32. In addition, distributed capacitance C1 is formed between the conductors 16 and 18 which sandwich the film sheet 14. Furthermore, each of the capacitors with throughholes 34 and 36 constitutes each capacitance C2 as shown in FIG. 6.

Values of the inductance L1 and L2 can be determined by length and width of the conductors 16 and 18, and the size and the magnetic permeability of the cores 30 and 32. A value of the capacitance C1 can be determined by an area where the conductors 16 and 18 oppose each other and the size and the dielectric constant of the film sheets 12 and 14. Noise in a normal mode can be eliminated by the capacitance C1 and noise in a common mode can be eliminated by the capacitance C2.

Figure 7:
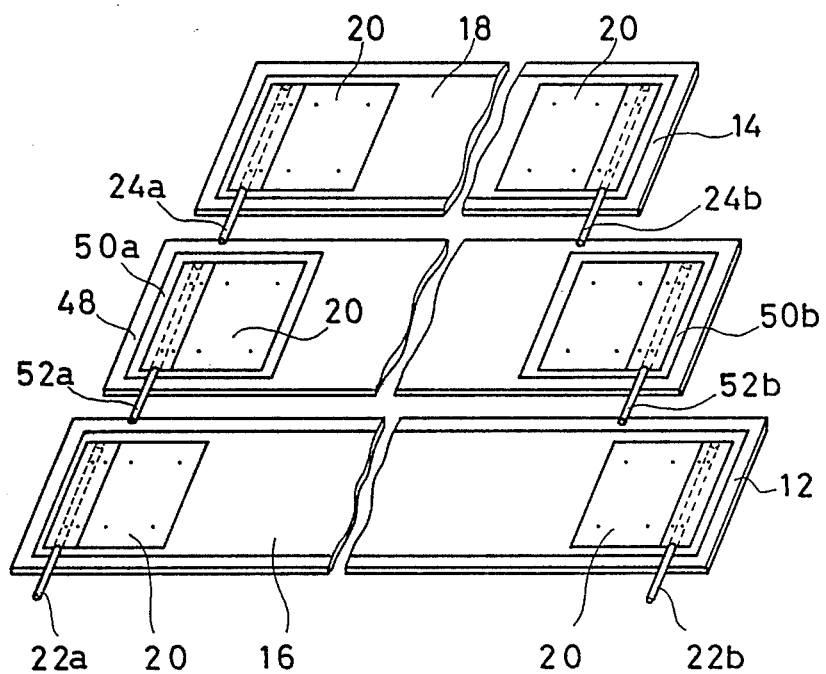
FIG. 7–FIG. 9 are illustrative views showing another embodiment in accordance with the present invention.

FIG. 7–FIG. 10 are illustrative views showing another embodiment in accordance with the present invention. In the previous embodiment, the capacitance C2 is constructed by the discrete capacitors with throughhole 34 and 36. However, it is possible to integrally form the capacitance C2 having an equal function to the capacitors with throughhole 34 and 36 within the cylindrical unit 28. To this end, in this embodiment, as shown in FIG. 7, a film sheet 48 made of an insulation material such as a polyester film is laminated or laid between the film sheets 12 and 14.

Figure 8:
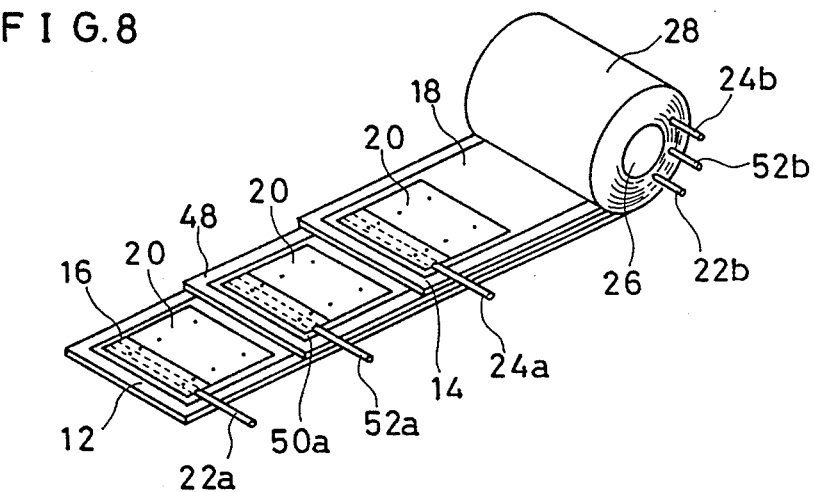

On one main surface of the film sheet 48, foil or leaf conductors 50a and 50b each of which is made of a metallic foil or leaf such, as aluminum, copper or the like and may be simply termed "conductor" hereinafter are adhered at both end portions in a longitudinal direction of the film sheet 48. Third terminals 52a and 52b are integrally fixed on the conductors 50a and 50b by the conductors 20. Then, the film sheet 48 is disposed between the film sheets 12 and 14, and as shown in FIG. 8, these film sheets 12, 48 and 14 are wound so as to form the cylindrical unit 28 likewise the previous embodiment.

Figure 9A:
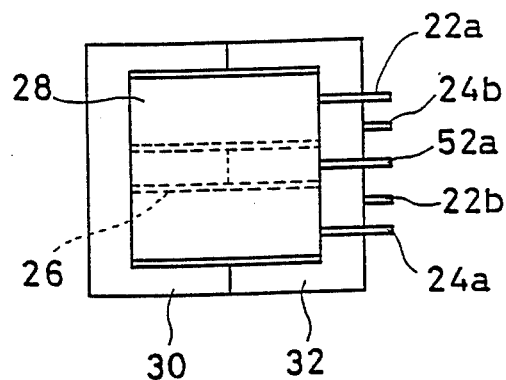
Figure 9B:
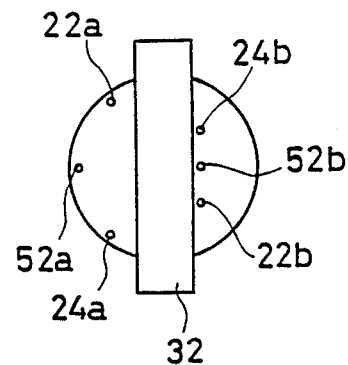

Thereafter, as shown in FIG. 9, the cores 30 and 32 are inserted into the hole 26 from both side ends of the wound unit 28. The terminals 22a–24b and 52a and 52b are projected at one end surface of the cylindrical unit 28. The third terminals 52a and 52b are used as ground connection terminals. Then, as necessary, the cylindrical unit 28 is housed within the casing as shown in FIG. 5. An equivalent circuit diagram of the noise filter thus completed is shown in FIG. 10.

Figure 10:
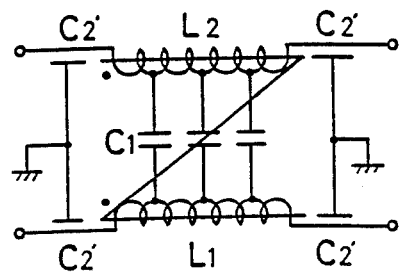
FIG. 10 is an equivalent circuit diagram of a noise filter completed in accordance with FIG. 7–FIG. 9.

Each capacitance C2' shown in FIG. 10 is formed between the conductor 50a and the conductors 16 and 18 and between the conductor 50b and the conductors 16 and 18.

In addition, in this embodiment as shown in FIG. 10, the capacitance C2' is formed at both of the input side and the output side; however, the capacitance C2' may be formed at only one of the input side and the output side. In this case, the conductor 50a or 50b may be formed at only a portion where the capacitance C2' is to be formed.

Figure 11:
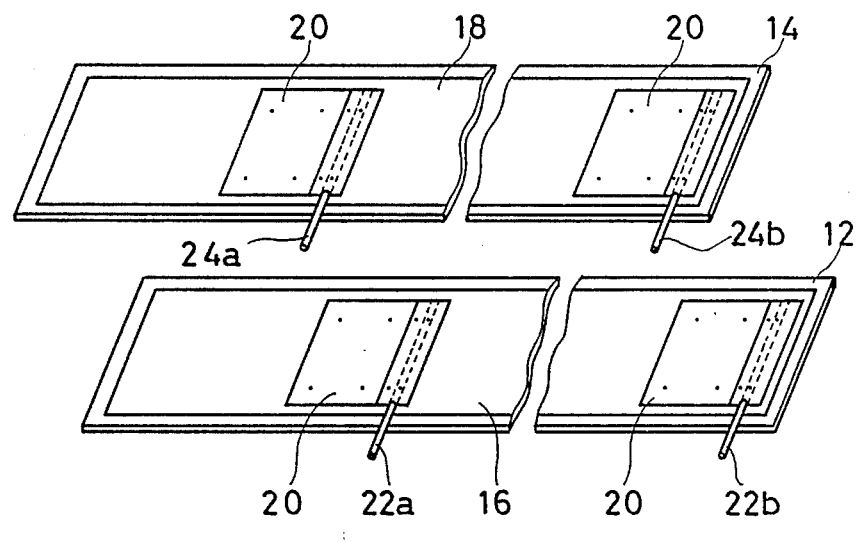
FIG. 11 and FIG. 12 are illustrative views showing another embodiment in accordance with the present invention.
Figure 12:
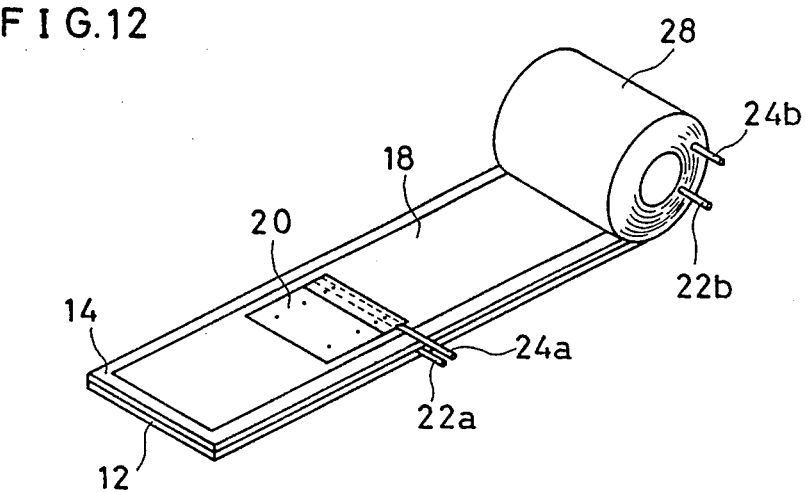

In addition, FIG. 11 and FIG. 12 show another embodiment in accordance with the present invention in which the first terminal 22a and the second terminal 24a of the embodiment shown in FIG. 2 and FIG. 3 are fixed on the conductors 16 and 18 at portions slightly inside the ends in a longitudinal direction of the conductors 16 and 18.

In the embodiment shown in FIG. 11 and FIG. 12, the distance between the first terminals 22a and 22b and the distance between the second terminals 24a and 24b are shorter than that of the embodiment shown in FIG. 2 and FIG. 3. Therefore, values of the inductance L1 and L2 shown in an equivalent circuit in FIG. 13 become smaller than that of the equivalent circuit shown in FIG. 6. On the other hand, the value of the capacitance C1 has no relation to the distance between the first terminals 22a and 22b and the distance between the second terminals 24a and 24b, depending instead upon the area where the conductors 16 and 18 oppose each other, etc. Therefore, in this embodiment, it is possible to change the values of the inductance L1 and/or L2 without changing the value of the capacitance C1. Therefore, by properly setting positions of the first terminals 22a and 22b and/or the second terminals 24a and 24b in a longitudinal direction of the conductors 16 and/or 18, or by arbitrarily setting the value of the capacitance C1 by changing the area where both conductors 16 and 18 oppose each other; that is, it is possible to easily obtain an optimum filter characteristic.

Figure 13A:
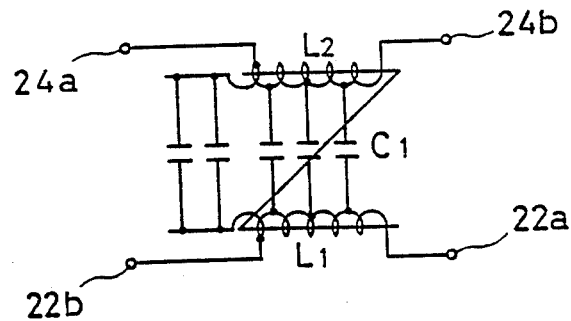
FIG. 13(A) and FIG. 13(B) are equivalent circuit diagrams of a noise filter completed in accordance with an embodiment shown in FIG. 11 and FIG. 12.
Figure 13B:
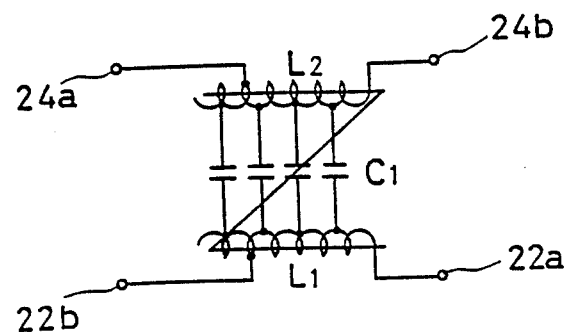

In addition, an equivalent circuit diagram is shown in FIG. 13. FIG. 13(A) shows a case where the values of the inductance L1 and L2 are not changed and only the value of the capacitance C1 is changed, and FIG. 13(B) shows a case where only the values of the inductances L1 and L2 are changed and the value of the capacitance C1 remains the same.

Furthermore, FIG. 14 and FIG. 15 show another embodiment in accordance with the present invention, in which the film sheet 48 of the embodiment shown in FIG. 7 and FIG. 8 is divided into the two film sheets 48a and 48b, and the first terminal 22a and the second terminal 24a are fixed on the conductors 16 and 18 at positions slightly inside the ends of the conductors 16 and 18 in a longitudinal direction.

Figure 16:
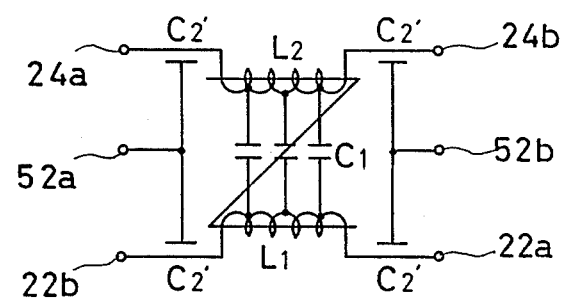
FIG. 16 is an equivalent circuit diagram of a noise filter completed in accordance with an embodiment shown in FIG. 14 and FIG. 15.

In this embodiment, as in the embodiment shown in FIG. 11 and FIG. 12, it is possible to arbitrarily set or determine the values of the inductance L1 and/or L2 in accordance with the distance between the first terminals 22a and 22b and/or the distance between the second terminals 24a and 24b. At the same time, since the film sheet 48 is divided into the film sheets 48a and 48b in this embodiment shown, by properly setting the positions of the film sheets 48a and 48b, that is, the positions of the conductors 50a and 50b, it is possible to arbitrarily adjust characteristics of the capacitance C2' in the equivalent circuit of FIG. 16.

In addition, such divided film sheets 48a and 48b can be applicable to the embodiment shown in FIG. 7 and FIG. 8.

Although not shown, the positions of the first terminal 22b and the second terminal 24b may be changed such that the same are fixed at positions slightly inside the ends of the conductors 16 and 18 in a longitudinal direction.

Furthermore, a shape of each core for increasing the inductance L1 and/or L2 is not limited to the "E" type shown in the above-described embodiments and may be "I" type or "U" type.

Figure 17:
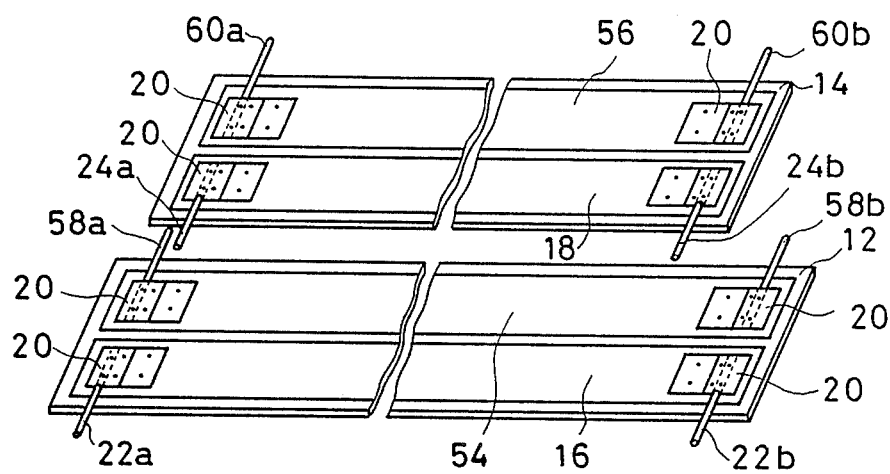
FIG. 17 is a perspective view showing unwound film sheets of another embodiment in accordance with the present invention.

In the FIG. 17 embodiment, on an upper surface of the film sheet 12, a plurality of (two in this embodiment) foil or leaf conductors 16 and 54 each of which is made of a metallic foil or leaf such as aluminum, copper or the like are adhered so as to be continuously extended in a longitudinal direction of the film sheet 12 but to be insulated from each other. Similarly, two foil or leaf conductors 18 and 56 each of which is made of a metallic foil or leaf such as aluminum, copper or the like are adhered on an upper surface of the film sheet 14.

Likewise, the previous embodiments, by fixing further foil or leaf conductors 20 on the foil and leaf conductors 16, 18, 54 and 56 by spot welding, for example, the terminals 22a and 22b, 24a and 24b, 58a and 58b, and 60a and 60b can be fixed to the conductors 16, 18, 54, and 56 at both ends thereof. After the terminals 22a, 22b, 24a, 24b, 58a, 58b, 60a and 60b are fixed as shown in FIG. 17, as shown in FIG. 18, the film sheets 12 and 14 are superposed and wound to form a wound unit or cylindrical unit 28 having a hollow portion or hole 26 at the center thereof.

Figure 18:
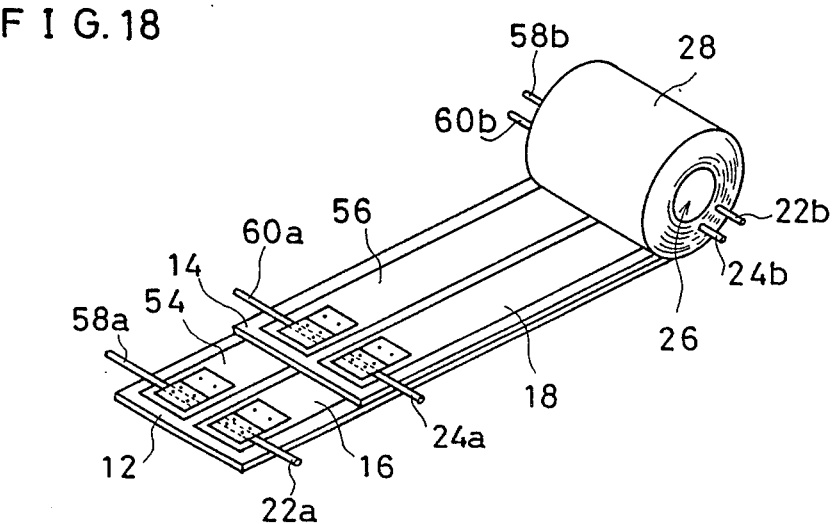
FIG. 18 is an illustrative view showing a state where film sheets shown in FIG. 17 are superposed and wound.

On both end surfaces of the wound unit or cylindrical unit 28 being formed as shown in FIG. 18, as shown in FIG. 19, reinforcing plates 62 being made of insulation material and each having a half circle shape are mounted, and the terminals 22a, 22b, 24a and 24b, and the terminals 58a, 58b, 60a and 60b are penetrated through the reinforcing plates 62, respectively. The terminals 22a and 24b and the terminals 58b and 60b among these terminals penetrating through the reinforcing plates 62 are folded-back, and such terminals 22a and 24a are respectively soldered and connected with the terminals 58b and 60b at approximately the center portion of the cylindrical unit 28. Therefore, the conductors 16 and 54 are electrically connected to each other by the terminals 22a and 58b, and the conductors 18 and 56 are electrically connected to each other by the terminals 24a and 60b.

In addition, in the above-described embodiment, the terminals 22a and 24a are directly connected with the terminals 58b and 60b, respectively by soldering, but these terminals may be connected to each other through patterns (not shown) of the printed circuit board. Such a printed circuit board may be a printed circuit board which is a part of a noise filter and fixed on the side surface of the cylindrical unit, or a printed circuit board on which the noise filter itself is mounted.

On the other hand, the terminals which are not folded-back, that is, the terminals 58a and 60a, and the terminals 22b and 24b are bent downward along the reinforcing plates 62, respectively, as shown in FIG. 19. Then, U-cores 64 and 66 are inserted into the hole 26 through holes of the reinforcing plates 62.

An equivalent circuit of the noise filter 10 thus obtained is shown in FIG. 20. More specifically, inductance L1 is formed between the terminals 58a and 22b by the conductors 16 and 54 formed on the film sheet 12 and the cores 64 and 66, and inductance L2 is formed between the terminals 60a and 24b by the conductors 18 and 58 formed on the film sheet 14 and the cores 64 and 66. Distributed capacitance C1 is formed between the conductors 16 and 54, and the conductors 18 and 56.

Values of the inductance L1 and L2 can be determined by length and width of the conductors 16 and 54 and the conductors 18 and by 56, and the size and the permeability of the cores 64 and 66. A value of the capacitance C1 can be determined by an area where conductors 16 and 54 and the conductors 18 and 56 oppose each other, and by the size and the dielectric constant of the film sheets 12 and 14.

Figure 21A:
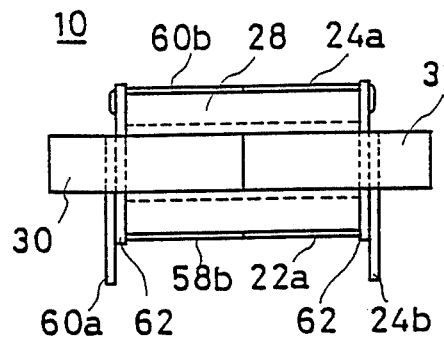
FIG. 21(A) and FIG. 21(B) are a front view and a side view showing a state where E-cores are inserted in a cylindrical unit or wound unit formed as shown in FIG. 18.
Figure 21B:
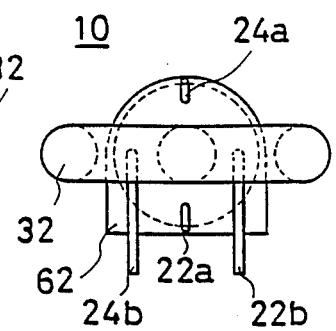

The cores for increasing the inductance L1 and/or L2 are not necessarily U-cores 64 and 66 as shown in FIG. 19, and may be E-cores 30 and 32 as shown in FIG. 21. If such E-cores 30 and 32 are inserted, since a magnetic resistance becomes smaller than that of U-cores, it is possible to increase the values of the inductances L1 and L2 of the noise filter 10.

Figure 22:
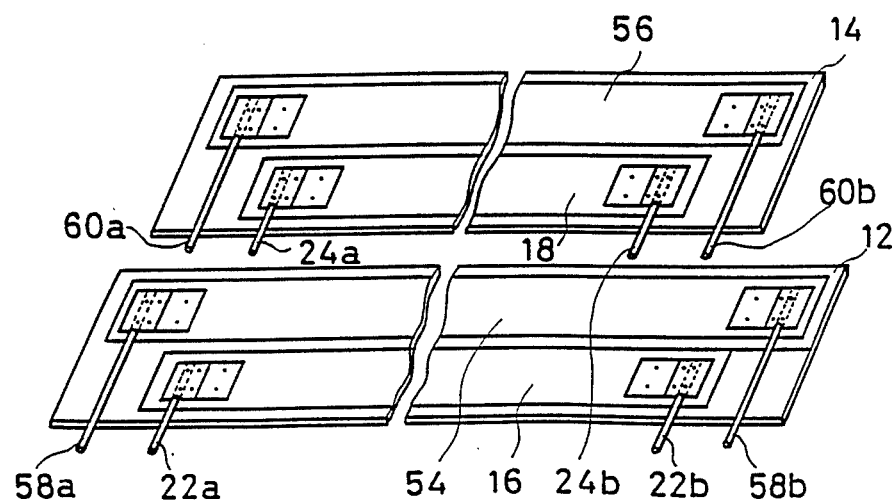
FIG. 22 is a perspective view showing unwound film sheets of another embodiment in accordance with the present invention.

In addition, in the above-described embodiment, a noise filter of an axial-lead type is described, but it is possible to obtain a noise filter of a radial-lead type by fixing the terminals 58a, 58b, 60a and 60b onto the conductors 54 and 56 in a manner shown in FIG. 22.

Figure 25A:
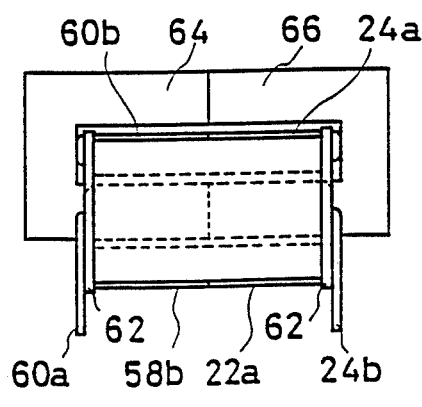
Figure 25B:
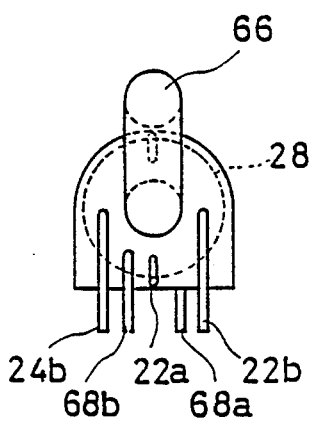
Figure 26A:
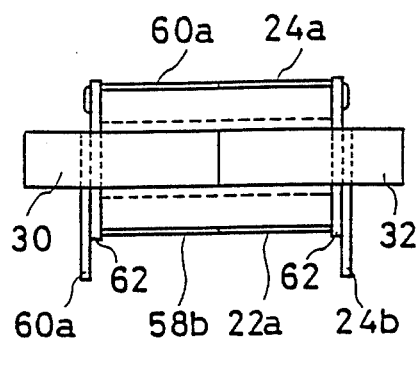
Figure 26B:
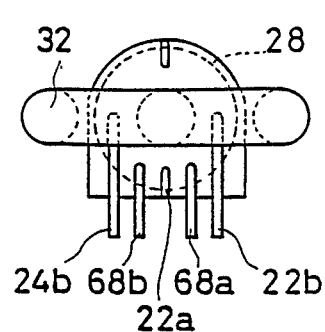
Figure 27:
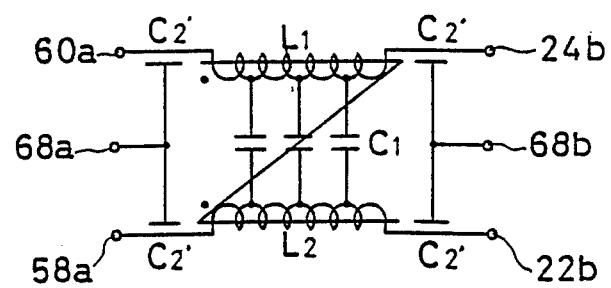
FIG. 27 is an equivalent circuit diagram of a noise filter completed in accordance with FIG. 23–FIG. 26.

FIG. 23–FIG. 27 are illustrative views showing another embodiment in accordance with the present invention. In this embodiment, as shown in FIG. 27, a further capacitance C2' other than the previous distributed capacitance C1 is integrally formed in the noise filter.

Figure 23:
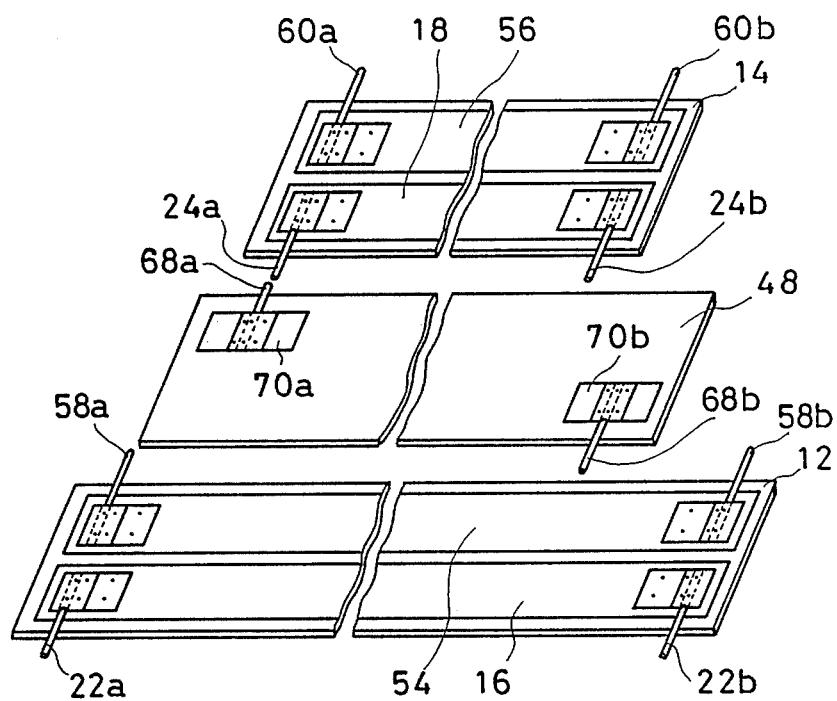
FIG. 23–FIG. 26 are illustrative views showing another embodiment in accordance with the present invention.
Figure 24:
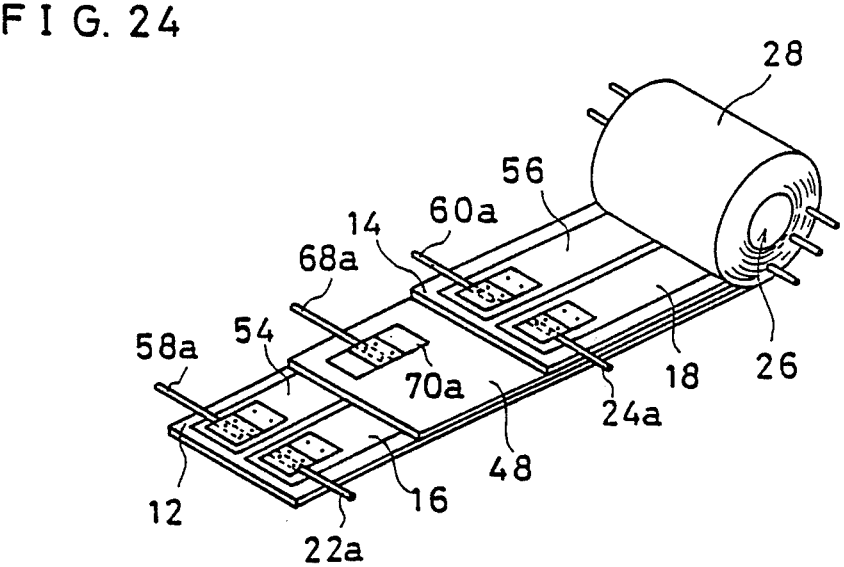

To this end, in this embodiment shown, as shown in FIG. 23, a film sheet 48 is disposed between the film sheets 12 and 14, and foil or leaf conductors 70a and 70b each of which is made of metallic foil or leaf are adhered on an upper surface of the film sheet 48 at both ends thereof, and to the conductors 70a and 70b; terminals 68a and 68b are fixed. This small conductor 70a is arranged so as to oppose to the conductors 54 and 56, and the small conductor 70b is arranged so as to oppose the conductors 16 and 18. This means that each of the conductors 70a and 70b forms each capacitance C2' by cooperation with the conductors 54 and 56 and 16 and 18. Then, in this embodiment shown, the film sheets 12, 14 and 48 are wound so as to form a cylindrical unit 28 as shown in FIG. 24 as in the previous embodiments.

Then, after mounting the afore-mentioned reinforcing plates 62, as shown in FIG. 25, the U-cores 64 and 66 are inserted in the cylindrical unit 28, or the E-cores 30 and 32 are inserted in the same as shown in FIG. 26. Since it is necessary to fold-back the terminals 22a and 58b, the terminals 68a and 68b are disposed between the terminals 58b and 60b and between the terminals 22a and 24b, respectively in this embodiment shown.

An equivalent circuit of the noise filter 10 thus obtained is shown by FIG. 27. As seen from FIG. 27, in this embodiment, each capacitance C2' is formed in relation with a respective one of the terminals 68a and 68b. Therefore, the noise filter 10 in accordance with this embodiment is used in a manner that the terminals 68a and 68b are connected to ground.

Figure 28:
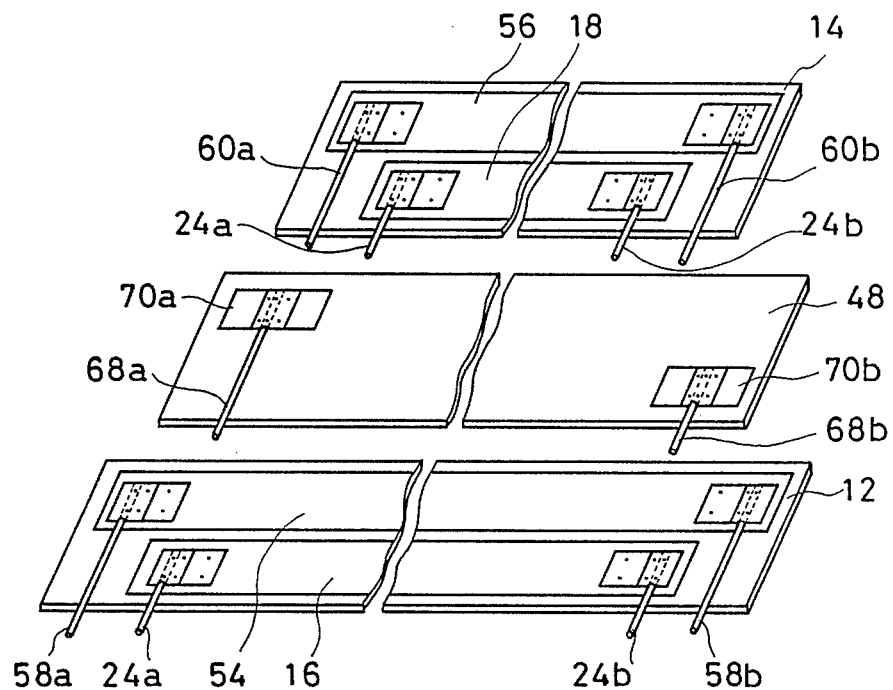
FIG. 28 is a perspective view showing unwound film sheets of the other embodiment in accordance with the present invention.

The embodiment shown in FIG. 23–FIG. 27 is a noise filter of an axial-lead type, but may be a radial-lead type as shown in FIG. 28.

In addition, in the above-described embodiment, two conductors 16 and 54, and 18 and 56 are adhered on the respective film sheets 12 and 14, but the number of such conductors may be three or more.

In the previous embodiments, the cores in combination of "U" type and "U" type or "E" type and "E" type are used, but such combination may be another combination of E type and I type, for example.

In the above-described embodiments, conductors are adhered on the film sheets, but such conductors may be formed on the film sheets by deposition, vacuum evaporation or metal plating. Furthermore, the film sheets may be substituted with insulation paper.

In addition, in the above-described embodiment, the terminals are withdrawn by bending the same downward outside the reinforcing plates; however, withdrawing directions of the terminals and the shapes thereof can be arbitrarily designed without limitations as in the above-described embodiments. Furthermore, it is not necessary to fix the terminals at the ends of the respective conductors in the embodiments of FIG. 17 and thereafter. The terminals can be fixed at any positions similar to the embodiments shown in FIG. 11 and FIG. 14 such that the values of the inductance L1 and/or L2 can be adjusted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:
1. A noise filter, comprising:
   a first longitudinal insulation sheet;
   a first conductor formed on one surface of said first insulation sheet so as to be extended in a longitudinal direction of said first insulation sheet, said first conductor having a pair of ends;
   two first terminals fixed on said first conductor, end portions of which are exposed in a width direction of said first insulation sheet, and one of said two first terminals being fixed near one end of said first conductor and the other of said two first terminals being fixed at a position substantially removed from the other end of said first conductor and approaching said one end of said first conductor;

a second longitudinal insulation sheet above said first insulation sheet;

a second conductor formed on one surface of said second insulation sheet so as to be extended in a longitudinal direction of said second insulation sheet; and two second terminals fixed to said second conductor, end portions of which are exposed in a width direction of said second insulation sheet, and one of said two second terminals being fixed near one end of said second conductor and the other of said two second terminals being fixed at a position substantially removed from the other end of said second conductor and approaching said one end of said second conductor;

said first and second insulation sheets being wound together with said first and second conductors so as to form a wound unit such that end portions of said first and second terminals can be exposed from an end surface of said wound unit, inductances being respectively formed between the first terminal by said first conductor and between the second terminals by said second conductor, and distributed capacitance being formed between said first and second conductors.

2. A noise filter in accordance with claim 1, further comprising a core inserted into a hollow portion of said wound unit.

3. A noise filter in accordance with claim 1, further comprising a third insulation sheet disposed between said first and second insulation sheets; a third conductor formed on said third insulation sheet and opposing at least one of said first and second conductors; and a third terminal fixed to said third conductor; wherein further distributed capacitance is formed between said third conductor and at least one of said first and second conductors.

4. A noise filter, comprising:
a first longitudinal insulation sheet;
a plurality of first conductors formed on one surface of said first insulation sheet so as to be respectively extended in a longitudinal direction of said first insulation sheet;
a plurality pairs of first terminals, respective pairs of said first terminals being fixed on respective ones of said plurality of said first conductors, said plurality of first conductors being connected in series by a predetermined one or more of said plurality of first terminals;
a second longitudinal insulation sheet atop said first insulation sheet;
a plurality of second conductors formed on one surface of said second insulation sheet so as to be respectively extended in a longitudinal direction of said second insulation sheet; and
a plurality of pairs of second terminals, respective pairs of said second terminals being fixed on respective ones of said plurality of said second conductors, said plurality of second conductors being connected in series by predetermined ones of said plurality of second terminals;
said first and second insulation sheets being wound together with said first and second conductors so as to form a wound unit such that end portions of said first and second terminals can be exposed from an end surface of said wound unit, an inductance being formed between a predetermined pair of said first terminals and a further inductance being formed between a predetermined pair of said second terminals, and a plurality of distributed capacitances being formed between respective ones of said first conductors and respective ones of said second conductors.

5. A noise filter in accordance with claim 4, further comprising a core inserted into a hollow portion of said wound unit.

6. A noise filter in accordance with claim 4, further comprising a third insulation sheet disposed between said first and second insulation sheets; a third conductor formed on said third insulation sheet and opposing at least one of said first and second conductors; and a third terminal fixed to said third conductor; wherein further distributed capacitance is formed between said third conductor and at least one of said first and second conductors.

7. A noise filter, comprising:
a first longitudinal insulation sheet;
a first conductor formed on one surface of said first insulation sheet so as to be extended in a longitudinal direction of said first insulation sheet, said first conductor having a pair of ends;
two first terminals fixed on said first conductor, end portions of which are exposed in a width direction of said first insulation sheet, and one of said two first terminals being fixed at a position substantially removed from one end of said first conductor and approaching the other end of said first conductor;
a second longitudinal insulation sheet above said first insulation sheet;
a second conductor formed on one surface of said second insulation sheet so as to be extended in a longitudinal direction of said second insulation sheet; and
two second terminals fixed to said second conductor, end portions of which are exposed in a width direction of said second insulation sheet, and one of said two second terminals being fixed at a position substantially removed from one end of said second conductor and approaching the other end of said second conductor;
said first and second insulation sheets being wound together with said first and second conductors so as to form a wound unit such that end portions of said first and second terminals can be exposed from an end surface of said wound unit, inductances being respectively formed between the first terminal by said first conductor and between the second terminals by said second conductor, and distributed capacitance being formed between said first and second conductors.

8. A noise filter in accordance with claim 7, further comprising a core inserted into a hollow portion of said wound unit.

9. A noise filter in accordance with claim 7, further comprising a third insulation sheet disposed between said first and second insulation sheets; a third conductor formed on said third insulation sheet and opposing at least one of said first and second conductors; and a third terminal fixed to said third conductor; wherein further distributed capacitance is formed between said third conductor and at least one of said first and second conductors.

* * * * *